United States Patent
Woo et al.

(10) Patent No.: US 9,455,602 B2
(45) Date of Patent: Sep. 27, 2016

(54) MOTOR

(71) Applicants: LG INNOTEK CO., LTD., Seoul (KR); INDUSTRY-UNIVERSITY COOPERATION FOUNDATION HANYANG UNIVERSITY, Seoul (KR)

(72) Inventors: Joon Keun Woo, Seoul (KR); Jung Pyo Hong, Seoul (KR); Kang Il Park, Seoul (KR)

(73) Assignees: LG INNOTEK CO., LTD., Seoul (KR); Industry-University Cooperation Foundation Hanyang University, Seoul (KR)

( * ) Notice: Subject to any disclaimer, the term of this patent is extended or adjusted under 35 U.S.C. 154(b) by 312 days.

(21) Appl. No.: 14/151,439

(22) Filed: Jan. 9, 2014

(65) Prior Publication Data
US 2014/0191609 A1    Jul. 10, 2014

(30) Foreign Application Priority Data
Jan. 9, 2013 (KR) .......... 10-2013-0002623

(51) Int. Cl.
*H02K 1/28* (2006.01)
*H02K 1/27* (2006.01)
*H02K 1/22* (2006.01)

(52) U.S. Cl.
CPC .............. *H02K 1/2773* (2013.01); *H02K 1/22* (2013.01); *H02K 1/276* (2013.01); *H02K 1/28* (2013.01); *H02K 2213/03* (2013.01)

(58) Field of Classification Search
CPC ........ H02K 1/2773; H02K 1/22; H02K 1/27; H02K 1/28; H02K 1/276; H02K 1/286
USPC ................ 310/156.13, 156.51–156.53
See application file for complete search history.

(56) References Cited

U.S. PATENT DOCUMENTS

| | | | |
|---|---|---|---|
| 6,392,324 B1 * | 5/2002 | Kuwahara | H02K 1/30 310/156.11 |
| 2001/0017499 A1 * | 8/2001 | Kaneko | H02K 1/2766 310/156.38 |
| 2010/0277028 A1 * | 11/2010 | Alexander | H02K 1/2773 310/156.51 |
| 2013/0088111 A1 * | 4/2013 | Park | H02K 1/2773 310/156.12 |

* cited by examiner

*Primary Examiner* — Terrance Kenerly
(74) *Attorney, Agent, or Firm* — Saliwanchik, Lloyd & Eisenschenk

(57) ABSTRACT

A motor includes a stator having a ring type structure and including a plurality of teeth protruding toward an inner surface of the stator and coils wound around the teeth; and a rotor including a core with a plurality of permanent magnets circumferentially magnetized inside the stator around a rotation shaft and a non-magnetic member between the core and the rotation shaft, and the permanent magnet includes a protrusion protruding to the non-magnetic member. An area of the permanent magnet is increased by increasing a length of the permanent magnet so that a magnetic flux can be increased to increase a torque.

13 Claims, 5 Drawing Sheets

MOTOR

CROSS-REFERENCE TO RELATED APPLICATION

This application claims the benefit under 35 U.S.C. §119 of Korean Patent Application No. 10-2013-0002623, filed Jan. 9, 2013, which is hereby incorporated by reference in its entirety.

BACKGROUND

The disclosure relates to a motor.

Generally, a motor used to generate a rotational driving force is classified into a surface-mounted permanent magnet motor and a buried permanent magnet motor according to a coupling structure of a permanent magnet installed at a rotor core.

FIG. 1 illustrates a stator core and a rotor core of a surface-mounted permanent magnet motor according to the related art.

As shown in FIG. 1, the surface-mounted permanent magnet motor 10 according to the related art includes a stator 1 having a substantially cylindrical shape and a rotor 3 rotatably received inside the stator 1.

The rotor is made by stacking a plurality of magnetic steel plates having the same shape to form the rotor core 3. A rotation shaft hole is axially formed at a central portion of the rotor core 3 so that a rotation shaft 5 is press-fitted in the rotation shaft hole to rotate together with the rotor.

Holes are circumferentially formed around the central portion of the rotor core 3 so that a plurality of permanent magnets 6 are inserted or attached into the holes, respectively.

A repulsive force is generated between adjacent permanent magnets 6. Meanwhile, the stator 1 includes a ring type core, a plurality of teeth circumferentially spaced apart from each other at an inner peripheral surface of the ring type core while interposing a predetermined slot therebetween, and coils 2 wound around the teeth and connected to an external power supply.

A non-magnetic member 4 is formed between the rotation shaft 5 and the rotor to concentrate a magnetic flux.

In this case, as an area of the permanent magnet is increased in an axial direction, the rotor core 3 becomes narrower. Accordingly, there are limitations to increase the area of the permanent magnet 6 in a central direction to ensure a sufficient magnetic flux.

BRIEF SUMMARY

The embodiment provides a motor capable of increasing an area of a permanent magnet.

According to the embodiment, there is provided motor including: a stator having a ring type structure and including a plurality of teeth protruding toward an inner surface of the stator and coils wound around the teeth; and a rotor including a core with a plurality of permanent magnets circumferentially magnetized inside the stator around a rotation shaft and a non-magnetic member between the core and the rotation shaft, wherein the permanent magnet comprises a protrusion protruding to the non-magnetic member.

The stator may include: a core having the ring type structure; a plurality of teeth protruding from an inner surface of the core; and the coils wound around the teeth, respectively.

The teeth may be radially formed.

The rotor may include: the non-magnetic member between the rotor and the rotation shaft; a plurality of protrusions protruding from the non-magnetic member; and a plurality of permanent magnets between the protrusions.

The non-magnetic member may have a ring shape.

The non-magnetic member may include a receiving groove to receive an end of the permanent magnet.

A width of the receiving groove may be gradually reduced toward the rotation shaft.

A width of an end of the permanent magnet may be gradually reduced toward the rotation shaft.

The rotor may include a protrusion protruding toward the non-magnetic member.

The protrusion of the rotor may be coupled with the non-magnetic member in a concavo-convex structure.

The protrusion of the rotor may include an expansion surface having a width gradually expanded toward the non-magnetic member.

According to the embodiment, an area of the permanent magnet is increased by increasing a length of the permanent magnet so that a magnetic flux can be increased to increase a torque.

Further, a magnetic flux concentration may be increased in the rotor without changing the size of the rotor, and a direction of the permanent magnet can be constantly maintained.

In addition, the protrusion is formed between the non-magnetic member and the rotor core so that an assembling property between the rotor and the non-magnetic member can be improved and a torque ripple can be reduced.

DETAILED DESCRIPTION

Hereinafter, the embodiments will be described with reference to accompanying drawings in detail so that those skilled in the art can easily realize the embodiments. However, the embodiments may have various modifications without limitation.

In the following description, when a part is referred to as it includes a component, the part may not exclude other components, but further include another component unless the context indicates otherwise.

Hereinafter, the motor according to the embodiment will be described with reference to FIGS. 2 and 3.

Figure 1:
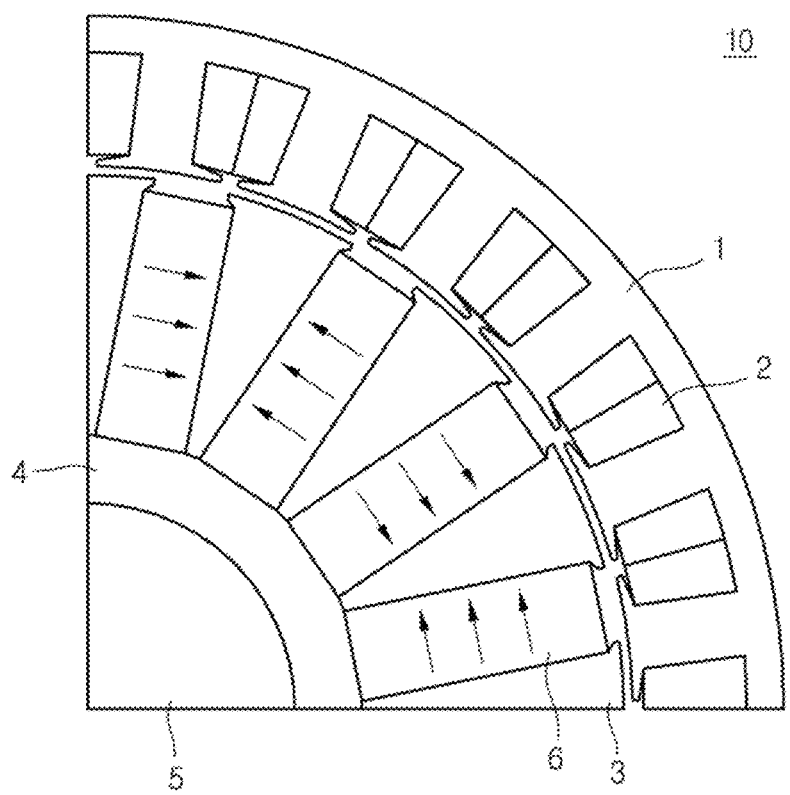
FIG. 1 is a plan view showing a motor according to the related art.
Figure 2:
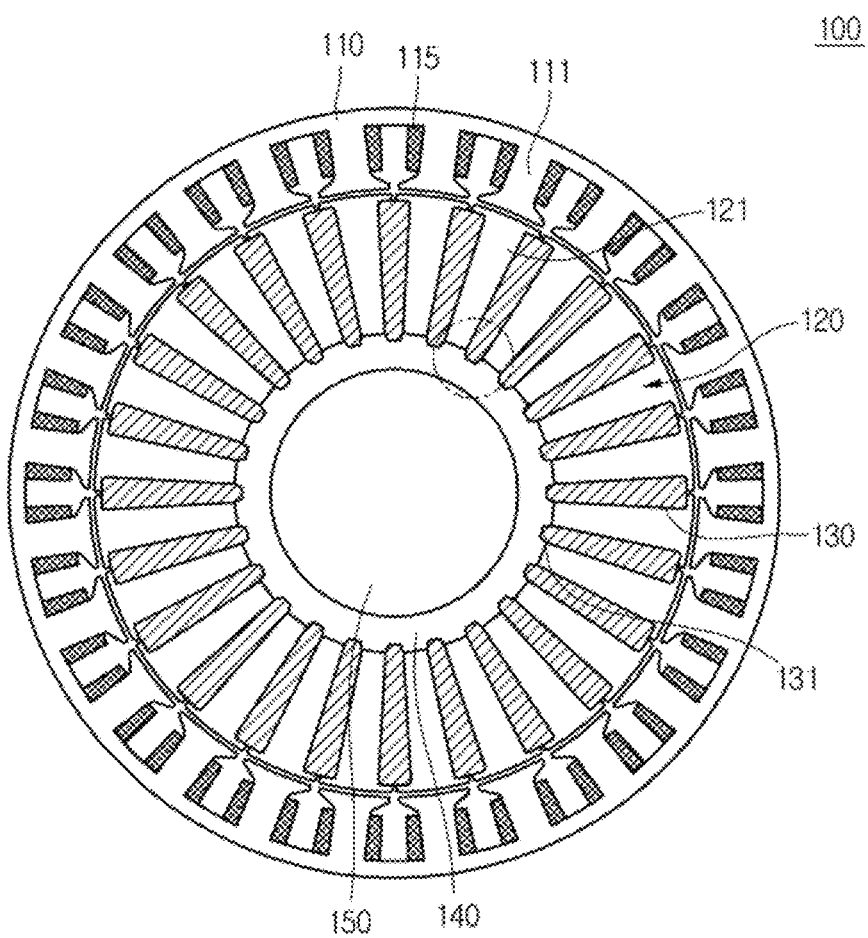
FIG. 2 is a plan view showing a motor according to an embodiment.

The motor 100 includes a rotation shaft 150, a non-magnetic member 140, a rotor 120, and a stator 110 as shown in FIG. 2.

The stator 110 includes a ring type core to form an outer peripheral portion and a plurality of teeth 111 radially protruding in a direction of the rotor 120 at an inner peripheral surface of the core.

Coils 115 connected to an external power supply are wound around the teeth 111, respectively. The teeth 111 have a structure with an area extending toward the rotor 120 so that the coils 115 may be fixed to the teeth 111.

The rotor 120 is arranged inside a core of the stator 110. The rotor 120 includes the non-magnetic member 140 having a ring shape around the rotation shaft 150, and a core coupled with the non-magnetic member 140 and having a plurality of permanent magnets 130.

The core includes a fixing protrusion 121 protruding between adjacent permanents 130 as shown in FIG. 2, and the permanent magnet 130 may be inserted or attached into a groove between the fixing protrusions 121.

The permanent magnet 130 formed in the groove of the core and the adjacent permanent magnet 130 are radially mounted in such a way that the permanent magnets 130 having the same polarity face each other so that the motor 100 is formed.

In this case, the non-magnetic member 140 coupled with the core includes a receiving groove 141 to receive an end of the permanent magnet 130.

The receiving groove 141 has a width d1 gradually reduced toward the rotation shaft 150.

Figure 3:
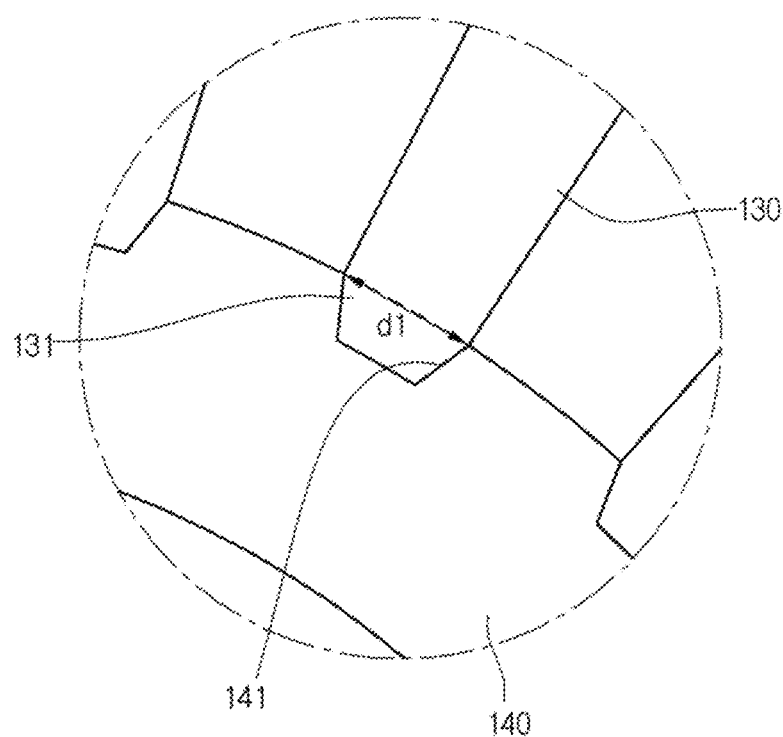
FIG. 3 is an enlarged view of FIG. 2.

A width d1 of the permanent magnet 130 is reduced when a top surface of the permanent magnet 130 extends from a groove of the core to the receiving groove 141 of the non-magnetic member 140 in a rectangular shape as shown in FIG. 3.

Accordingly, a magnetic flux is increased by extending a length of the permanent magnet 130 to the non-magnetic member 140 so that a torque may be increased.

Hereinafter, the motor 100A according to another embodiment will be described with reference to FIGS. 4 and 5.

Figure 4:
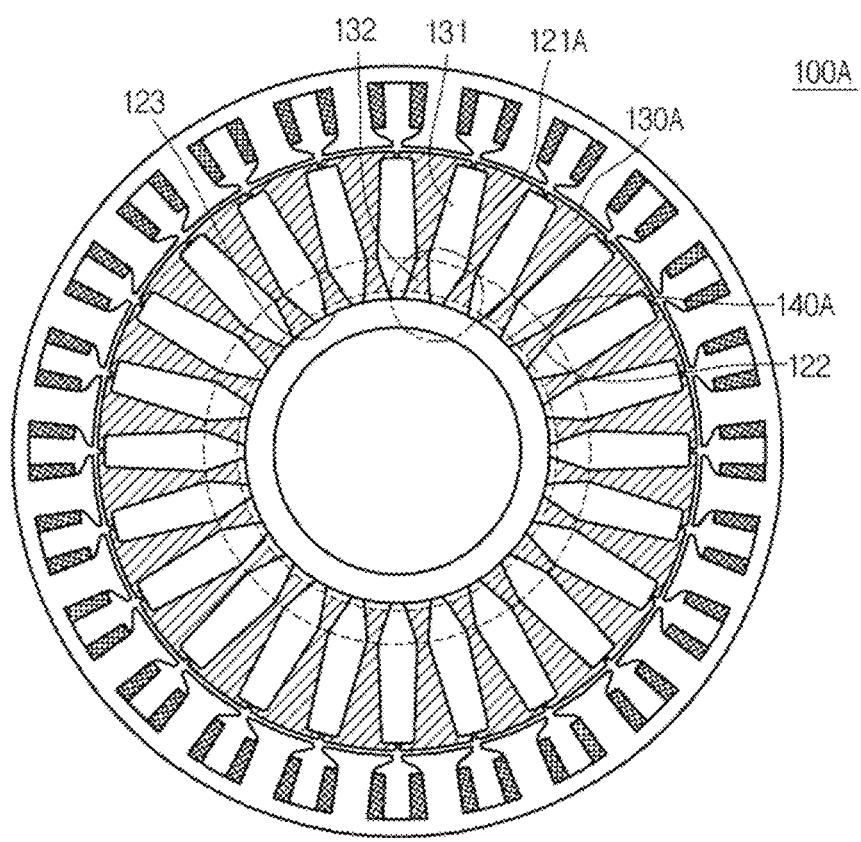
FIG. 4 is a plan view showing a motor according to another embodiment.

The motor 100A includes a rotation shaft 150, a non-magnetic member 140, a rotor 120, and a stator 110 as shown in FIG. 4.

The stator 110 includes a ring type core to form an outer peripheral portion and a plurality of teeth 111 radially protruding in a direction of the rotor 120 at an inner peripheral surface of the core.

Coils 115 connected to an external power supply are wound around the teeth 111, respectively. The teeth 111 have a structure with an area extending toward the rotor 120 so that the coils 115 may be fixed to the teeth 111.

The rotor 120 is arranged inside a core of the stator 110. The rotor 120 includes the non-magnetic member 140 having a ring shape around the rotation shaft 150 and a core coupled with the non-magnetic member 140 and having a plurality of permanent magnets 130.

Figure 5:
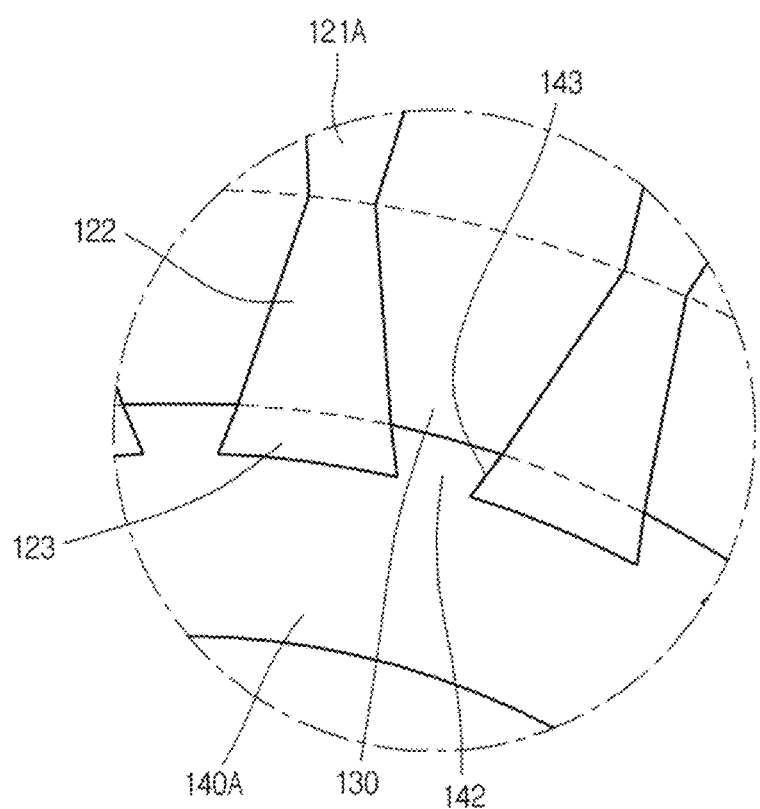
FIG. 5 is an enlarged view of FIG. 4.

The core includes a fixing protrusion 121 protruding between adjacent permanents 130 as shown in FIG. 5, and the permanent magnet 130 may be inserted or attached into a groove between the fixing protrusions 121.

The permanent magnet 130 formed in the groove of the core and the adjacent permanent magnet 130 are circumferentially magnetized in such a way that the same polarities face each other, thereby providing the motor 100A.

In this case, the non-magnetic member 140 coupled with the core has a concavo-convex structure in which a protrusion 142 is provided at a region making contact with an end of the permanent magnet 130.

A fixing protrusion 121A protruding from the core is disposed at a concave portion 143 adjacent to the protrusion 142.

An end of the permanent magnet 130 has a width gradually reduced toward the non-magnetic member 140. Accordingly, even if a length of the permanent magnet 130 is increased, an end of the fixing protrusion 121 of the core forming a circumference may have a predetermined width.

Further, the end of the fixing protrusion 121 is inserted into the concave portion 143 of the non-magnetic member 140 so that bonding strength between the core of the rotor 120 and the non-magnetic member 140 is improved.

As described above, since the width of the permanent magnet 130 is reduced by increasing the length of the permanent magnet 130 so that a width of the core can be maintained at a predetermined level, a torque can be increased by increasing a magnetic flux, and a ripple of the torque can be reduced.

Although a preferred embodiment has been described for illustrative purposes, those skilled in the art will appreciate that various modifications, additions and substitutions are possible, without departing from the scope and spirit of the invention as disclosed in the accompanying claims.

What is claimed is:

1. A motor comprising:
a stator having a ring type structure; and
a rotor including a core with a plurality of permanent magnets circumferentially magnetized inside the stator around a rotation shaft and a non-magnetic member between the core and the rotation shaft,
wherein the stator comprises:
a core having the ring type structure;
the plurality of teeth protruding from the inner surface of the core; and
the coils wound around the teeth, respectively,
wherein the rotor comprises:
the non-magnetic member between the rotor and the rotation shaft;
a plurality of protrusions protruding from the non-magnetic member; and
the plurality of permanent magnets between the protrusions,
wherein the non-magnetic member has a ring shape,
wherein the permanent magnet comprises a protrusion protruding to the non-magnetic member,
wherein the non-magnetic member comprises a receiving groove to receive an end of the permanent magnet, and
wherein a width d1 of the receiving groove is gradually reduced toward the rotation shaft.

2. The motor of claim 1, wherein the teeth are radially formed.

3. The motor of claim 1, wherein a width of an end of the permanent magnet is gradually reduced toward the rotation shaft.

4. The motor of claim 3, wherein the rotor comprises a protrusion protruding toward the non-magnetic member.

5. The motor of claim 4, wherein the protrusion of the rotor is coupled with the non-magnetic member in a concavo-convex structure.

6. The motor of claim 4, wherein the protrusion of the rotor comprises an expansion surface having a width gradually expanded toward the non-magnetic member.

7. The motor of claim 6, wherein the non-magnetic member comprises a concave portion.

8. The motor of claim 7, wherein the protrusion of the rotor is inserted into the concave portion of the non-magnetic member.

9. The motor of claim 1, wherein a width of the permanent magnet is reduced as the permanent magnet extends from a groove of the core to the receiving groove of the non-magnetic member.

10. The motor of claim 9, wherein a cross-section of a portion of the permanent magnet in the groove of the core has an approximately rectangular shape.

11. The motor of claim 1, wherein a width of each permanent magnet of the plurality of permanent magnets between the protrusions is gradually reduced toward the rotation shaft.

12. The motor of claim 11, wherein a width of each protrusion of the plurality of protrusions protruding from the non-magnetic member is greater than the width of each permanent magnet of the plurality of permanent magnets between the protrusions.

13. The motor of claim 1, wherein a width of each protrusion of the plurality of protrusions protruding from the non-magnetic member is gradually increased toward the rotation shaft.

\* \* \* \* \*